No. 729,903. PATENTED JUNE 2, 1903.
G. SENGER.
BALING PRESS.
APPLICATION FILED NOV. 10, 1902.
NO MODEL.
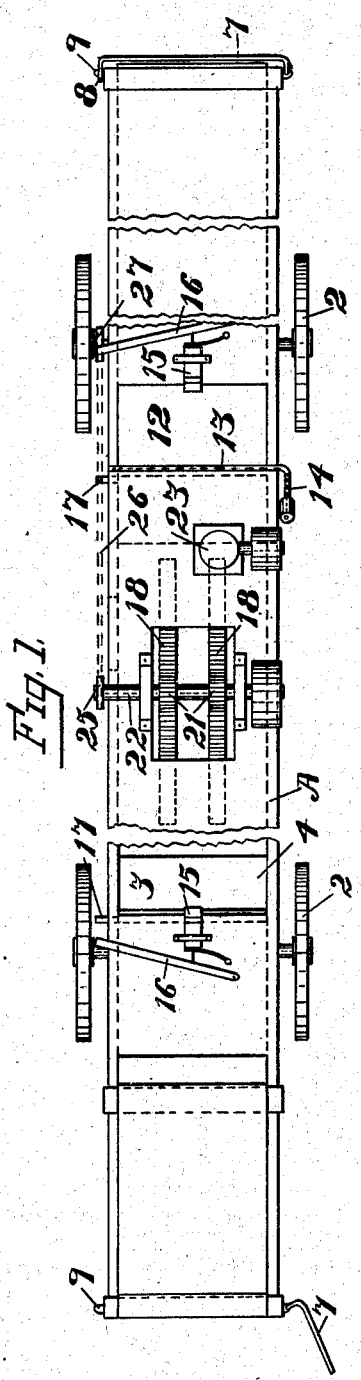
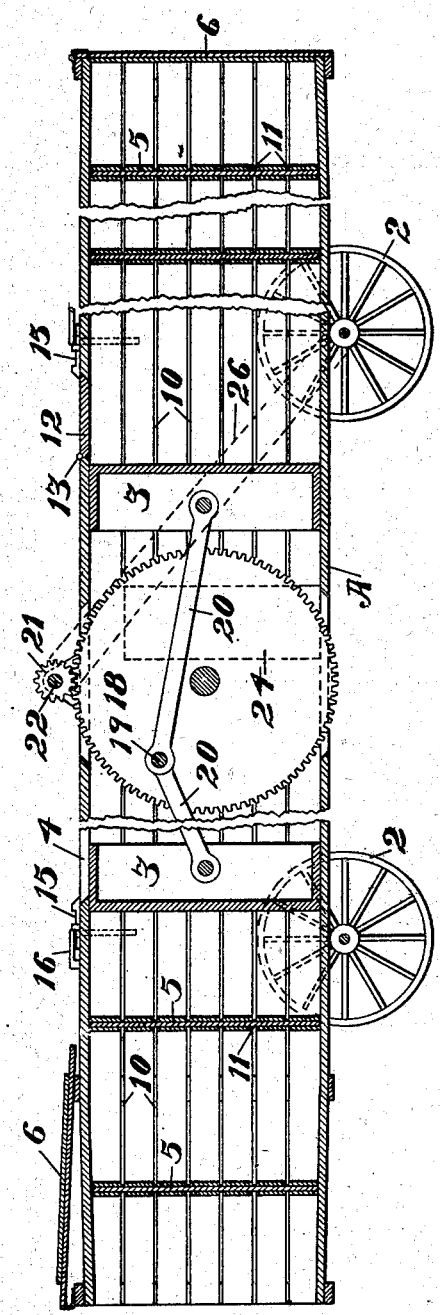
Witnesses,
Dudley Moss.
Inventor,
George Senger No. 729,903. Patented June 2, 1903.

UNITED STATES PATENT OFFICE.

GEORGE SENGER, OF SAN FRANCISCO, CALIFORNIA.

BALING-PRESS.

SPECIFICATION forming part of Letters Patent No. 729,903, dated June 2, 1903.

Application filed November 10, 1902. Serial No. 130,665. (No model.)

*To all whom it may concern:*

Be it known that I, GEORGE SENGER, a citizen of the United States, residing in the city and county of San Francisco, State of California, have invented an Improvement in Baling-Presses; and I hereby declare the following to be a full, clear, and exact description of the same.

My invention relates to improvements in horizontal presses of the continuous type. Its object is to provide a press of maximum capacity in which there need be no cessation of operations, either for feeding, tying, or discharging, in which the operating mechanism for the followers is simple, and in which the same power driving the followers may be utilized to coöperate in propelling the carriage upon which the press may be mounted.

It consists of the parts and the construction and combination of parts hereinafter more fully described having reference to the accompanying drawings, in which—

Figure 1 is a top plan view of my invention. Fig. 2 is a central longitudinal vertical section of same.

A represents a portable press-box mounted upon the wheels 2. Within the box are the followers 3, acting alternately to compress the material outward first in one end of the box and then in the other. The hay or other material to be baled is introduced continuously through the openings 4, and the charges are compressed between the loosely-movable partitions 5. The ends of the box are provided with suitable closures 6, hinged at the top and locked when closed by means of the U-shaped spring-bars 7, which have one end pivoted to the side of the box and the other end formed with eyes 8, adapted to engage staples 9 in the opposite side of the box when the end is sprung over the staple. The baling-chambers at the opposite ends of the box are choked or contracted, so that greater and greater pressure is required to force a bale through a chamber as the bale nears the discharge end.

In operation the doors 6 are closed only when the first bale or two in either chamber is being compressed. As soon as one bale is made a partition 5 is inserted through a feed-opening 4 and the next bale compressed behind the partition, the wires being passed through the slots 10 between the slats forming the press-box and the grooves 11 in the partition.

Either end of the box is adapted to contain three or more bales in course of compression, so that tying, discharging, compressing, and feeding are going on simultaneously and continuously.

The choked character of the baling-chambers insures sufficient resistance to the rearmost bales, so that after operations are once well begun the doors 6 remain open and the completed bales are forced out by the continued addition of material through the filling-doors. The partition ejected with each bale is available to be again placed in the press. The feed-openings 4 are closed by doors 12, which are each mounted on a rock-shaft 13, carrying a weighted arm 14, by which the doors tend normally to remain open. A spring-pressed latch 15 is adapted to engage and hold a door closed during the forward traverse of a feed-opening by a follower. The latch has an arm 16 extending over the side of the press into the path of a projection 17 on the forward end of the follower, which projection 17 protrudes through a slot 10 in the press-box. When a plunger is about to move forward to compress a charge, the operator closes door 12. As soon as the follower passes opening 4 the latch is tripped and the door flies open of its own accord.

The means for continuously operating the followers are as follows: Two large gears 18 are disposed centrally of the press and intermediate of the followers. These gears have independent bearing-shafts and are connected by a crank-pin 19, to which the pitmen 20, extending in opposite directions and operating the followers, are united. Pinions 21 upon the horizontal shaft 22 engage the gears 18, and power is applied to the pinion-shaft from any suitable source, such as a gasolene-engine 23 upon the press-frame, or, if desired, a revolving horse-power may be employed with such intermediate gearing as is necessary to transmit motion continuously.

Among the advantages of using the interposed gears 18 are the simplicity of the mechanism and the fact that the followers are reciprocated continuously and without loss of time.

When it is necessary to move the press, as is often the case, over rough and hilly roads, the power usually employed only to operate the followers may be diverted to aid in the propulsion of the press-carriage. For this purpose the pitmen are disconnected from the crank 19, access being had to the interior of box A for the purpose through a door 24. The pinion-shaft carries a sprocket 25, and a chain 26 passes over this sprocket and a corresponding sprocket 27 on the rear wheel. The team may thus be materially aided in moving the press over heavy places.

Having thus described my invention, what I claim, and desire to secure by Letters Patent, is—

1. The combination in a baling-press of a press-box open at the ends, compression-chambers contracted toward their outer ends formed in the ends of said press-box, followers movable in said chambers, said chambers each having a separate feed-opening and closures for said openings, said closures each including a door adapted normally to stand open, a spring-pressed latch slidable upon the press-frame and engaging the door to lock it when closed, and means upon the catch extending into the path of the follower whereby the catch is released to allow the door to swing open as the follower traverses the feed-opening.

2. The combination in a continuous baling-press, of a press-box open at the ends, doors swinging outward and upward to close said ends, spring U-bars substantially as described to lock said doors, followers reciprocable in unison intermediate of the ends of the press-box, and gearing interposed between said followers to operate the latter.

3. The combination of a horizontal press-box mounted upon a wheeled carriage, followers movable in said press-box, gearing substantially as described interposed between said followers, a source of power located upon the press-box, means by which the followers may be disconnected from said gearing, and connections between the gearing and the wheels supporting the press-box by which the power usually employed to operate the followers may be diverted to propel the press-box carriage.

In witness whereof I have hereunto set my hand.

GEORGE SENGER.

Witnesses:
S. H. NOURSE,
JOHN STEINER.